United States Patent Office 3,278,318
Patented Oct. 11, 1966

3,278,318
TUNGSTEN OXIDE-METAL METAPHOSPHATE GLASSES
Joseph R. Hensler, Rochester, and Robert A. Weidel, Webster, N.Y., assignors to Bausch & Lomb Incorporated, Rochester, N.Y., a corporation of New York
No Drawing. Filed Mar. 28, 1963, Ser. No. 268,550
9 Claims. (Cl. 106—47)

This invention relates to novel glass compositions and more particularly to novel compositions having unusual characteristics which are desirable for their optical properties. Such glasses are also interesting for electrical applications.

Previous attempts to develop high index glasses having high optical dispersion values resulted in a glass having at least 75% by weight of metal oxides selected from a group including tungsten oxide ($WO_3$). Such compositions are disclosed in the patent of W. R. Beck et al. 2,853,393. The compositions disclosed therein include at least two metal oxides being each present in an amount of at least 5% and containing either or both of the metal oxides $BiO_3$ and $PbO$ in an amount of at least 40%. The glasses are further disclosed by the absence or use of only small amounts i.e. 10% or less of the strong glass forming oxides such as phosphorous pentoxide.

Glasses of the aforementioned type are of such nature that they cannot be employed as making optical elements of the usual sizes and shapes. They have a strong tendency to devitrify which limits their commerical application to those elements having a thickness which does not exceed approximately 2 mm.

The compositions according to the present invention can be manufactured in relatively large melts and do not have the strong tendency for devitrification present in the aforementioned prior art glasses. Furthermore, these glasses may be manufactured into optical elements of the usual sizes and shapes. Presently it is thought that the novel glasses disclosed herein are particularly desirable for their electrical properties.

Briefly, the glass compositions disclosed herein consist essentially of tungsten oxide and a phosphate material. The phosphate material is preferably a metaphosphate selected from the group consisting of barium metaphosphate, sodium metaphosphate, potassium metaphosphate, lithium metaphosphate, magnesium metaphosphate, calcium metaphosphate, lead metaphosphate, aluminum metaphosphate and mixtures thereof. Generally the metaphosphates are present in an amount of at least 15 weight percent batch basis and the tungsten oxide is present in an amount up to 83% by weight batch basis.

The metaphosphates are more desirable than other phosphorous materials such as phosphorous pentoxide since they are more stable and therefore improve the reproducability of the glasses, simplify the handling techniques, and facilitate melting the compositions. The tungsten oxide is shown in the form of $WO_3$. This form has been selected in view of its commercial availability, however, it is not intended to limit the scope of the present invention to that valence form, since it is readily understood that other valence forms may be substituted according to conventional techniques.

Various other oxides or glass modifiers may be added in minor amounts to the examples disclosed herein. The quantities of such oxides and modifiers is governed by conventional glass techniques, however, for a first approximation they would not exceed 10 weight percent. These oxides may be added to the batch as the oxides themselves or any desired material that will decompose or react in the melt to produce the specified oxides. For example, the corresponding carbonates or hydrates may be used. Examples of these materials include barium carbonate, zinc oxide, potassium carbonate, sodium carbonate, titanium dioxide, zirconium oxide, calcium carbonate, magnesium carbonate, strontium carbonate, lead oxide, borax, lithium oxide, rubidium oxide, cesium oxide, cadmium oxide, aluminum oxide, lanthanum oxide, silica, germanium dioxide, niobium oxide, tantalum oxide, bismuth oxide, tellurium oxide and others.

The conditions and controls for carrying out the melting, annealing, and cooling steps are subject to wide variation. For example, in some cases a batch of raw ingredients may be melted in a refractory pot, crucible or a platinum lined vessel. Similarly, temperatures, times and conditions vary according to the amount of glass being formed, therefore the temperature and melting conditions recited hereinafter are given by way of illustration and are not intended to limit the scope of the appended claims.

For example, the ingredients in the powdered form are mixed together and placed in a platinum crucible. The crucible containing the mixture is placed in an electric resistance furnace and the ingredients are melted therein at a temperature of approximately 900–1250° C. Relatively small melts were made in this manner and were held at this temperature for approximately 3–4 hours. Larger melts could also be made at this same temperature, however, with larger melts it is desirable to stir the glass according to conventional glass making techniques for approximately 4 hours. The melts were cast at approximately 700°–1200° C. on a plate having a temperature of approximately 100° C.–300° C. All types of the glass disclosed herein were annealed at approximately 400–450° C.

Such matters as contained in the text "Properties of Glass" by G. W. Morey, "Modern Ophthalmic Lenses and Optical Glass" by Theo. E. Obrig (1935) and "The Manufacture of Optical Glass and of Optical Systems," Ordnance Department, Document 2037, Government Printing Office 1924, set forth additional details about glass manufacturing. Such details are considered to comprise the background information about the manufacture of optical glasses and are considered to be conventional.

Tungsten oxide compositions containing alkaline earth metaphosphates have a characteristic blue color. The density of this blue increases as the tungsten oxide is increased, however, it should be noted that those compositions containing relatively small amounts of the alkaline earth compounds have an amber color which changes to a grey and subsequently to a blue color as the tungsten oxide is increased.

The following examples set forth several operative embodiments and are not to be construed as limiting the scope of the invention. The examples are given in weight percent batch basis:

| Example | 1 | 2 | 3 | 4 | 5 | 6 | 7 | 8 |
|---|---|---|---|---|---|---|---|---|
| $Ba(PO_3)_2$ | 23 | 30 | 40 | 50 | 60 | 70 | 80 | 85 |
| $WO_3$ | 77 | 70 | 60 | 50 | 40 | 30 | 20 | 15 |

| Example | 9 | 10 | 11 | 12 | 13 | 14 | 15 | 16 | 17 |
|---|---|---|---|---|---|---|---|---|---|
| $K(PO_3)$ | 17 | 20 | 30 | 40 | 50 | 60 | 70 | 80 | 85 |
| $WO_3$ | 83 | 80 | 70 | 60 | 50 | 40 | 30 | 20 | 15 |

| Example | 18 | 19 | 20 | 21 | 22 | 23 | 24 | 25 |
|---|---|---|---|---|---|---|---|---|
| $Ba(PO_3)_2$ | 10 | 15 | 20 | 25 | 30 | 35 | 40 | 45 |
| $KPO_3$ | 10 | 15 | 20 | 25 | 30 | 35 | 40 | 40 |
| $WO_3$ | 80 | 70 | 60 | 50 | 40 | 30 | 20 | 15 |

| Example | 26 | 27 | 28 | 29 | 30 | 31 | 32 | 33 |
|---|---|---|---|---|---|---|---|---|
| $NaPO_3$ | 25 | 30 | 40 | 50 | 60 | 70 | 80 | 85 |
| $WO_3$ | 75 | 70 | 60 | 50 | 40 | 30 | 20 | 15 |

| Example | 34 | 35 | 36 | 37 | 38 | 39 | 40 | 41 |
|---|---|---|---|---|---|---|---|---|
| $LiPO_3$ | 20 | 30 | 40 | 50 | 60 | 70 | 80 | 85 |
| $WO_3$ | 80 | 70 | 60 | 50 | 40 | 30 | 20 | 15 |

| Example | 42 | 43 | 44 | 45 | 46 | 47 | 48 | 49 |
|---|---|---|---|---|---|---|---|---|
| $Mg(PO_3)_2$ | 20 | 30 | 40 | 50 | 60 | 70 | 80 | 85 |
| $WO_3$ | 80 | 70 | 60 | 50 | 40 | 30 | 20 | 15 |

| Example | 50 | 51 | 52 | 53 | 54 | 55 | 56 | 57 |
|---|---|---|---|---|---|---|---|---|
| $Ca(PO_3)_2$ | 20 | 30 | 40 | 50 | 60 | 70 | 80 | 85 |
| $WO_3$ | 80 | 70 | 60 | 50 | 40 | 30 | 20 | 15 |

The examples including potassium metaphosphate and tungsten oxide are presently considered to be the preferred compositions, however, those compositions including sodium metaphosphate and lithium metaphosphate also appear more desirable than the other cited examples. Generally the preferred compositions for optical uses are a compromise which contain the maximum amount of tungsten oxide with a minimum color. For example, the barium metaphosphate tungsten oxide compositions produce an objectionable color when tungsten is present within the range of 10-20 weight percent while the alkali metaphosphates such as potassium produce a glass with satisfactory color within a range of 40-50% tungsten oxide. For electrical properties, however, the glasses having the highest tungsten oxide content are more desirable since color is relatively unimportant.

It should be understood that mixes of various metaphosphates can be used in place of a single metaphosphate. An example of this is shown in those examples containing barium metaphosphate, potassium metaphosphate and tungsten oxide. Other mixtures are also compatible with tungsten oxide and in the various examples a portion of a particular metaphosphate may be replaced by some other compatible metaphosphate such as those shown in the other examples.

What is claimed is:

1. A glass composition consisting essentially of tungsten oxide and at least one metaphosphate selected from the group consisting of barium metaphosphate, potassium metaphosphate, sodium metaphosphate, lithium metaphosphate, magnesium metaphosphate, calcium metaphosphate, wherein the tungsten oxide is present within the range of 15-85 weight percent and the metaphosphate is present in the range of 15-85 weight percent.

2. A composition according to claim 1 which includes minor amounts of glass modifiers.

3. A glass composition consisting essentially of tungsten oxide and barium metaphosphate wherein the tungsten oxide is present within the range of 15-77 weight percent and the barium metaphosphate is present within the range of 23-85 weight percent.

4. A glass composition consisting essentially of tungsten oxide and potassium metaphosphate wherein the tungsten oxide is present within the range of 15-83 weight percent and the potassium metaphosphate is present within the range of 17-85 weight percent.

5. A glass composition consisting essentially of tungsten oxide and sodium metaphosphate wherein the tungsten oxide is present within the range of 15-75 weight percent and the sodium metaphosphate is present within the range of 25-85 weight percent.

6. A glass composition consisting essentially of tungsten oxide and lithium metaphosphate wherein the tungsten oxide is present within the range of 15-80 weight percent and the lithium metaphosphate is present within the range of 20-85 weight percent.

7. A glass composition consisting essentially of tungsten oxide and magnesium metaphosphate wherein the tungsten oxide is present within the range of 15-80 weight percent and the magnesium metaphosphate is present within the range of 20-85 weight percent.

8. A glass composition consisting essentially of tungsten oxide and calcium metaphosphate wherein the tungsten oxide is present within the range of 15-80 weight percent and the calcium metaphosphate is present within the range of 20-85 weight percent.

9. A glass composition consisting essentially of tungsten oxide and a mixture including barium metaphosphate and potassium metaphosphate wherein tungsten oxide is present within the range of 15-80 weight percent and metaphosphate mixture is present in the range of 20-85 weight percent.

References Cited by the Examiner

UNITED STATES PATENTS 2,577,627 12/1951 Pincus _____ 106—47

FOREIGN PATENTS 761,005 11/1956 Great Britain.
799,600 8/1958 Great Britain.

TOBIAS E. LEVOW, *Primary Examiner.*

H. McCARTHY, *Assistant Examiner.*